United States Patent [19]

Winkler

[11] 4,343,455

[45] Aug. 10, 1982

[54] HIGH VACUUM VALVE CONSTRUCTION

[75] Inventor: Otto Winkler, Balzers, Liechtenstein

[73] Assignee: Balzers Aktiengesellschaft für Hochvakuumtechnik und Dünne Schichten, Liechtenstein

[21] Appl. No.: 123,399

[22] Filed: Feb. 21, 1980

[30] Foreign Application Priority Data

Feb. 26, 1979 [CH] Switzerland .................. 1858/79

[51] Int. Cl.³ .............................................. F16K 31/12
[52] U.S. Cl. ...................................... 251/58; 251/167; 251/175; 251/195; 49/363
[58] Field of Search ................ 251/58, 167, 175, 195; 49/363

[56] References Cited

U.S. PATENT DOCUMENTS

| | | | |
|---|---|---|---|
| 1,733,685 | 10/1929 | Gamble | 251/175 |
| 1,957,807 | 5/1934 | Robinson | 251/175 X |
| 2,372,273 | 3/1945 | Herwauson | 251/58 |
| 2,556,578 | 6/1951 | Dobin | 49/363 |
| 3,524,467 | 8/1970 | Worley | 251/175 X |
| 3,596,874 | 8/1971 | DiSanto | 251/175 |
| 3,717,322 | 2/1973 | Bernard | 251/167 X |
| 4,244,557 | 1/1981 | Polkede | 251/167 |

FOREIGN PATENT DOCUMENTS 2639198 9/1978 Fed. Rep. of Germany ...... 251/167
854311 11/1960 United Kingdom ................ 251/175

Primary Examiner—Harold W. Weakley
Attorney, Agent, or Firm—McGlew and Tuttle

[57] ABSTRACT

A high vacuum valve comprises a casing having a valve inlet port and a valve outlet port connected to the inlet port with a valve seat defined between the inlet and outlet ports. The casing also defines a valve movement passageway and a valve member is movable in the housing along the passageway between a position in which it is aligned with the valve seat for closing the valve and one in which it is out of alignment with the seat to open the valve. The valve member includes two separate relatively movable plate parts both of which move along the passageway together and one of which is movable when the valve member is aligned with the valve seat so as to move into engagement with the seat. For this purpose a fluid pressure operated force transmissive device is located between the two plate parts and when supplied with fluid pressure it is effective to move one of the plate parts firmly against the seat while it is braced against the other plate part with the other plate part itself being braced by the passageway of the casing.

5 Claims, 6 Drawing Figures

HIGH VACUUM VALVE CONSTRUCTION

FIELD AND BACKGROUND OF THE INVENTION

The invention relates in general to vacuum treatment devices and in particular to a new and useful high-vacuum valve, particularly an ultra-high vacuum gate valve, comprising a valve casing with gas inlet and outlet ports and a valve shutter body and an associated drive element.

In vacuum valves, the valve shutter body which, in large valves, is mostly designed as a plate, must be pressed into contact with the valve seat by a sufficiently high pressure to ensure a satisfactory tightness, even to atmospheric pressure, if necessary.

Particular requirements are imposed on ultra-high vacuum valves. Not only an extremely low leakage rate but also a low gas emission and impermeability rate of the sealing element, and heatability up to 400° C., to accelerate the degassing, are required. The two last mentioned requirements can be met only with a metal seal. Then, to obtain low leakage rates, extraordinarily high sealing forces are needed, in the order of magnitude of 100 to 1,000 N per millimeter sealing length. Therefore, very high contact pressures are needed in valves having large diameters and, consequently, a long sealing line along their circumference.

To drive vacuum gate valves, pneumatic actuating mechanism, toggle lever or tapering tracks are used which are disposed between the valve plate and a counterplate. Valve plate and counterplate then bear against the casing along the circumference of the valve ports. To permit absorption of the strong forces by the casing without causing a distortion of the sealing surface, the casing must be extraordinarily stable in shape, which entails high material and manufacturing costs.

SUMMARY OF THE INVENTION

The present invention is directed to a high-vaccum valve in which the shut-off pressure is taken up along the circumference of the valve seat without substantially stressing the casing in other respects. The main characterizing feature of the inventive high-vacuum valve is that supporting elements are provided which transmit the sealing forces to the circumference of the valve seat. The forces are thus distributed uniformly and a distortion of the sealing flange is avoided, and the valve casing can be made of a light metal, since what it has to stand is only the outer atmospheric pressure. This is particularly important in large ultra-high vacuum valves, such as those needed for fusion reactors, and in high-vacuum lock valves having large nominal diameters.

Since the contact forces are transmitted to the close vicinity of the valve seat, it is sufficient to design this seat alone for absorbing the correspondingly strong forces. The other portions of the valve casing may be dimensioned for substantially less stresses and thus become far less expensive. In the most simple way, the contact pressures may be transmitted through a plurality of clamps, for example channel or angle sections, uniformly distributed over the circumference of the valve seat and disposed so as not to hinder the motion of the valve gate. For this purpose, the supporting elements are advantageously connected partly to the valve shutter body and partly to the valve seat which serves as a mounting abutment.

Accordingly, it is an object of the invention to provide a high-vacuum valve which comprises a casing which has a valve inlet port and a valve outlet port connected to the inlet port with a valve seat defined therebetween which also includes a valve movement passageway in the casing adjacent the valve seat with a valve member movable along the passageway between a position in alignment with the seat and one of alignment with the seat and wherein the valve member includes two separate plate parts both of which move along a passageway together and one of which is movable when the valve members align with the valve seat into firm engagement with the valve seat and further including fluid pressure operated force transmission means acting between the plate parts to move the one relatively to and away from the other and to press it against the seat.

A further object of the invention is to provide a high-vacuum valve which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
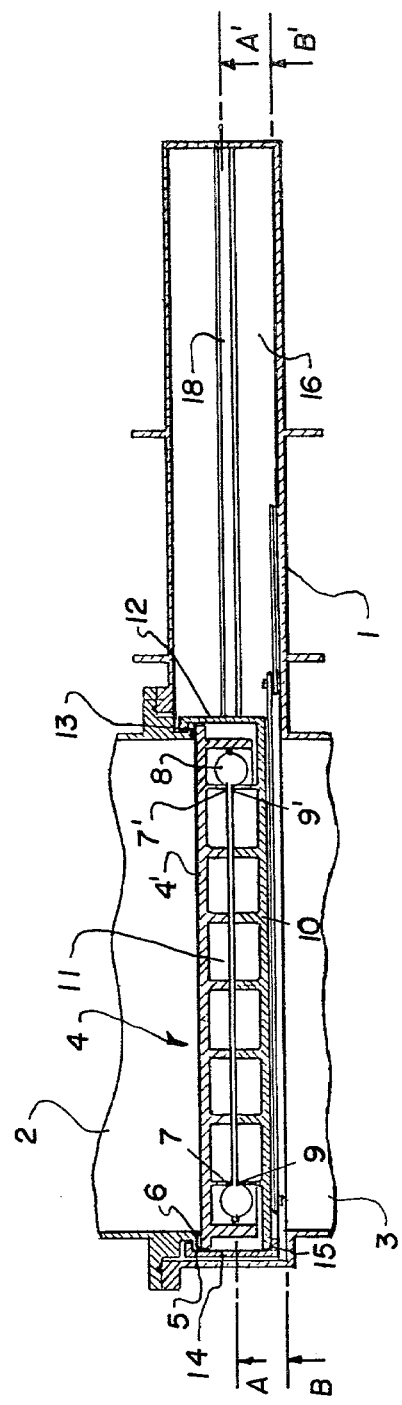
FIG. 1 is a partial sectional view of a valve constructed in accordance with the invention.
Figure 2:
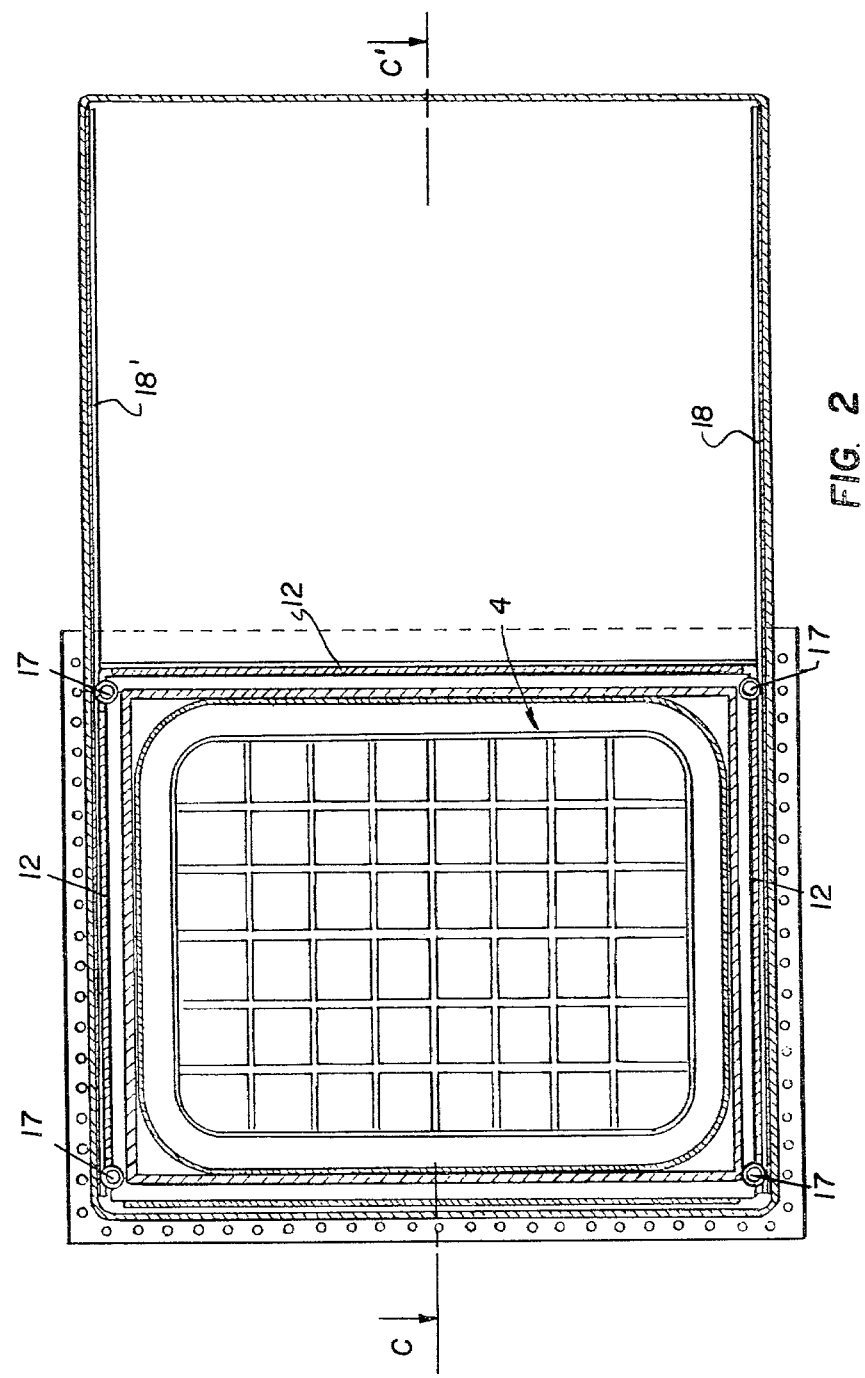
FIG. 2 is a partial top plan and horizontal sectional view of the valve shown in FIG. 1 taken along the line A—A'.
Figure 3:
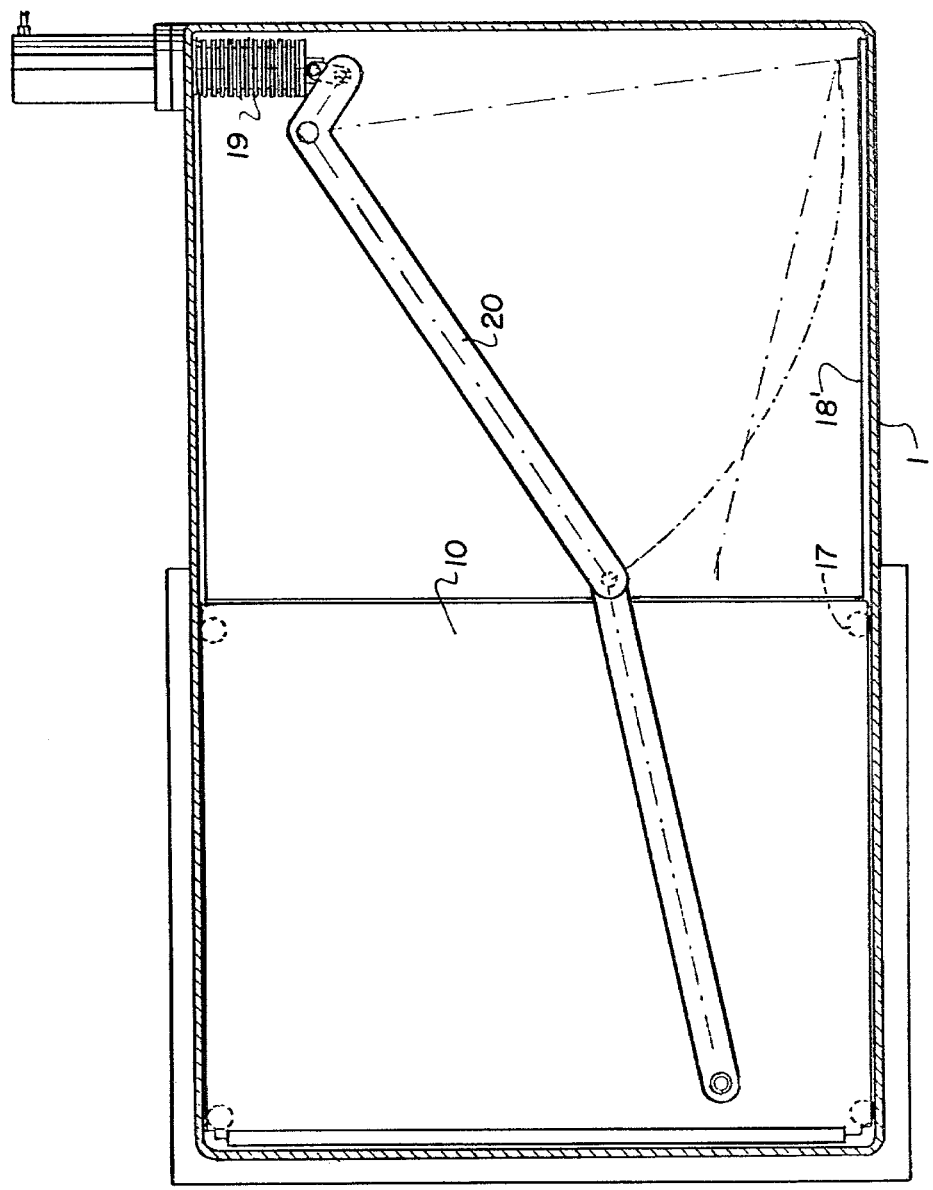
FIG. 3 is a section taken along the line B—B' of FIG. 1.

Referring to the drawings, in particular the invention embodied therein, FIGS. 1, 2 and 3 comprises a valve including a valve casing 1 which has an inlet port portion 2 and an outlet port portion connected thereto and also includes a valve seat 5 defined therebetween the inlet and outlet ports. A valve member generally designated 4 includes a valve plate part 4' and a valve counterplate part 10 which are movable together along a passageway defined in the housing 1 between a position shown in FIGS. 1, 2 and 3 in which the valve member 4 is aligned with the valve seat 5 for the purpose of closing the valve to one in which the valve member 4 is moved off to the right of this location in a fully opened position. In the closed position with the valve member 4 aligned with the valve seat 5 the plate part 4' is movable relative to the plate part 10 under the action of forced transmission means which in this embodiment comprises an elastic spring body 8 which when pressurized will force the valve plate part 4' firmly against the seat 5.

FIG. 1 shows a valve casing 1 with two connection ports 2 and 3. In a closed position, a valve plate 4 and valve seat 5 with a seal 6 close port 2 hermetically. Valve plate part 4' is reinforced with ribs and tightly welded, at 7, to an elastic spring body 8 having an omega-shape cross section and forming a closed ring. The other end of the spring body is welded at 9 to an also ribbed counterplate 10 so that an enclosed intermediate space or cavity 11 is formed which may be filled with a pressure fluid.

Channel section supporting elements 12 are welded or screwed to counterplate 10 along the upper and lower borders thereof as well as at the right hand side, and in the closed position of the valve, these elements engage over a flange 13 of the valve seat 5. A similar channel section 14 is secured to the valve seat at 5 and at the left hand side of this flange. This section is also intended for supporting the counterplate at a location 15, but the counterplate 10 is not connected to channel section 14.

If the intermediate space 11 is relieved of pressure, the valve plate disengages from the valve seat and the counterplate disengages from contact faces 13 and 15 due to the resilience of spring body 8, so that the sealing unit can now be moved in casing part 16 to the right. To perform this operation substantially without friction and with a minimum force, four ball bearings 17 are provided on frame 12 surrounding counterplate 10, which run in rails 18, 18' (see FIG. 2). The force is transmitted through a bellows 19 and a linkage 20 as shown in FIG. 3.

Figure 4:
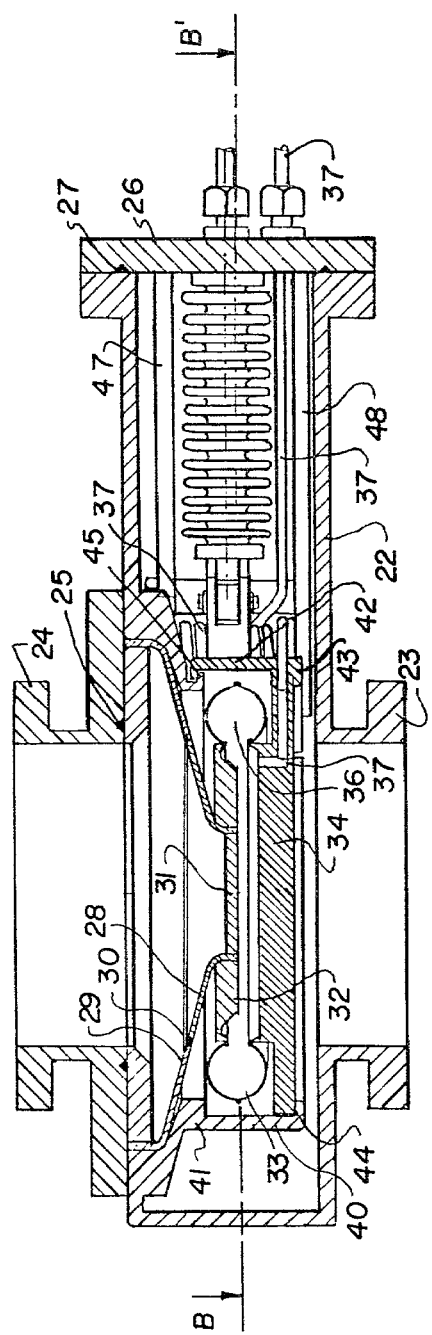
FIG. 4 is a view similar to FIG. 1 of another embodiment of the invention.
Figure 5:
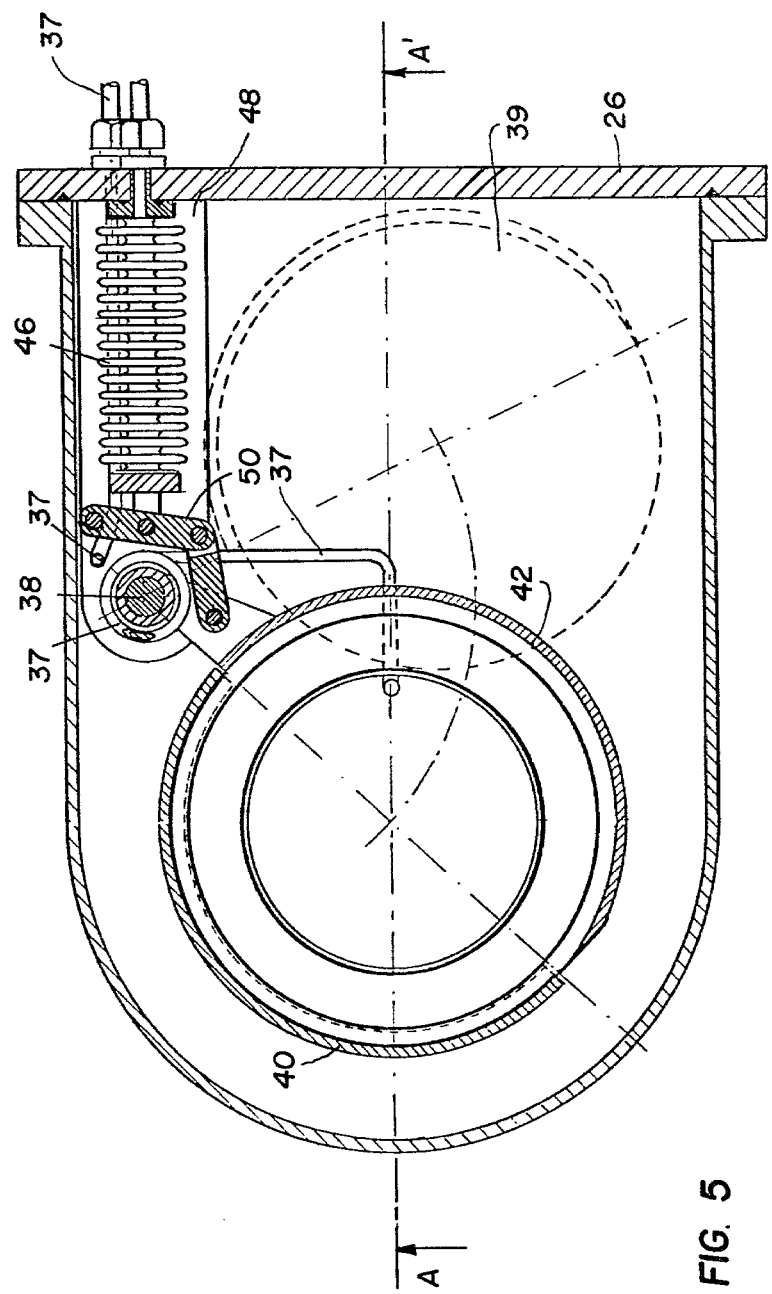
FIG. 5 is a section taken along the line B—B' of FIG. 4.

FIGS. 4 and 5 show another embodiment of an inventive, metal-sealed ultra-high vacuum gate valve, having a smaller diameter and a circular passage opening, (scale about 1 to 2). FIG. 4 is a section taken along the line A—A' of FIG. 5, and FIG. 5 is a section taken along the line B—B' of FIG. 4.

Valve casing 22 again has two connection flanges of which one (23) is welded to casing 22 and the other (24) is screwed thereto and provided with a metal seal 25.

The mechanism for actuating the valve plate is secured to flange 26 which is screwed to the casing with the interposition of a metal seal 27. With the valve relieved of pressure and upon unscrewing flange 26, the whole mechanism can be withdrawn as a unit from casing 22.

Figure 6:
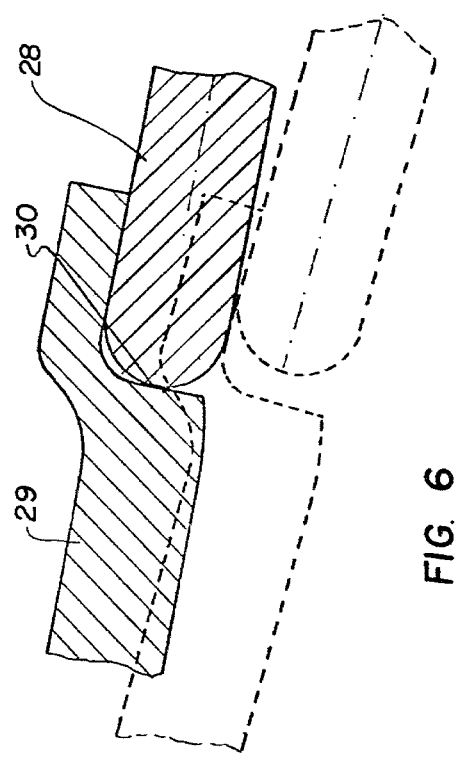
FIG. 6 is an enlarged sectional detail showing the interengagement of the valve with the valve seat in the embodiment of FIGS. 4 and 5.

The sealing of the valve is effected through two conical cup springs 28 and 29, of which one (28) is welded to the valve mechanism and the other (29) is welded into casing 22. The sealing line extends at 30. FIG. 6 is an enlarged partial sectional view of this detail. The solid lines show the cup springs in the closed position of the valve. The dotted lines correspond to the valve position shortly prior to closing.

Due to the use of conical cup springs as sealing elements, substantially smaller contact pressures in the axial direction are needed. This is important particularly in ultra-high vacuum valves having an unfavorable sealing length-to-pressure surface ratio, especially in instances where the contact pressure is effected pneumatically or dydraulically. Then, the required contact pressure remains within limits which can better be controlled, and the sealing line where the mating parts contact each other, is centered automatically.

Valve cup 28 is welded into parts 31 and 32. Part 32 is further welded to a toroidal spring element 33. Counterplate 34 is also welded to this spring element, so that again an enclosed cavity 36 is formed which can be supplied with a pressure fluid through lines 37.

The valve is designed as a so called oscillating gate which is pivoted at 38 (FIG. 5) and can be swung out into a position 39 shown in dotted lines in FIG. 5.

The idea of transmitting the force direction into the vicinity of the valve seat is embodied by using semicircular channel sections of which one (40) is welded or screwed to the fixed part of the seal at 41, and the other (42) is secured at 43 to the pivotal part of the valve mechanism. The first part serves as a rest for the gate at 44. The latter one 42 engages a groove 45 provided in the fixed part, in order to support the oscillating gate at that location in the closed position of the valve. The torsional forces are thereby uniformly distributed over the entire circumference of the valve opening.

As shown in FIG. 5, here again the forces are transmitted through a bellows 46 which is supplied with pressure and is mounted by means of a lever mechanism 50 and through parts 47, 48 which are secured to connecting plate 26.

While specific embodiments of the invention have been shown and described in detail to illustrate the application of the principles of the invention, it will be understood that the invention may be embodied otherwise without departing from such principles.

What is claimed is:

1. A high-vacuum valve comprising a casing having a valve inlet port, a valve outlet port connected to said inlet port, a valve seat including a flange extending at least partly therearound, said seat defined in said casing between said valve inlet port and said valve outlet port, said casing also defining a valve movement passageway adjacent said valve seat, a valve member movable in said housing on said passageway between a position in which said valve member is aligned with said valve seat for closing the valve to a position in which said valve member is out of alignment with said valve seat for opening said valve, said valve member including at least two separate relatively movable plate parts both of which move along said passageway and one of which is movable relative to the other when said valve member is aligned with said valve seat and into firm engagement with said seat, and drive force transmission means acting between said plate parts to move at least one relatively to the other in a direction to place it against said seat, the other of said plate parts being braced by said casing passageway, a channel section member connected to said housing and engaged over a part of said flange, and with said valve member in its aligned position, engaged with said other of said plate parts, said other of said plate parts including a support element engaged over said flange in its aligned position.

2. A high vacuum valve according to claim 1 wherein said valve seat is rectangular and said valve member is rectangular and comprises two rectangular plate members, said channel section disposed along one side of said valve seat and said valve seat defined on said flange, said section overlying the flange and extending downwardly therefrom and having a lower flange extending toward said valve member, said valve member including a low plate portion having a front edge abutting into said channel section in a trailing edge with a top flange engageable over said valve seat flange and forming said support element on the end thereof away from said channel section.

3. A high-vacuum valve according to claim 1, wherein said inlet and outlet port portions are in alignment, said casing including an annular formation defining said seat, said valve passageway including a trackway defined in said casing between said inlet and outlet port and extending laterally therefrom, said valve member comprising two plates one interposed over the other, said means comprising fluid pressure operated force transmission means comprising a elastic spring body disposed between said plates and being expandible to force of said plates away from the other.

4. A high-vacuum valve according to claim 3 including a drive connected to said valve member for shifting it along said passageway.

5. A high vacuum valve according to claim 1 wherein said valve seat includes a cup shaped spring member having a bottom wall with an annular opening, one of said plate bars including a cup shaped spring member having a diameter permitting said spring member to engage the lip of said spring member of said seat.

* * * * *